Figure 1:
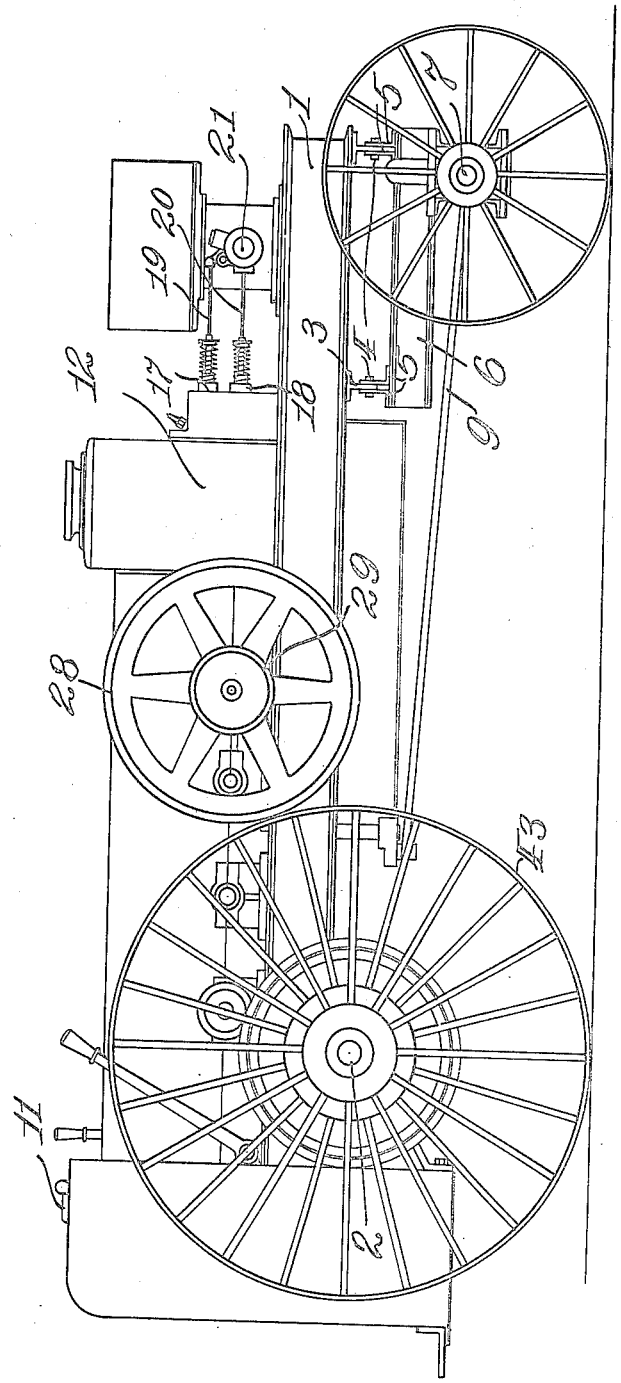

C. A. STICKNEY.
TRACTOR.
APPLICATION FILED SEPT. 17, 1915.

1,222,812.

Patented Apr. 17, 1917.
2 SHEETS—SHEET 1.

Inventor:
Charles A. Stickney,
by: C. D. Enoch,
Attorney.

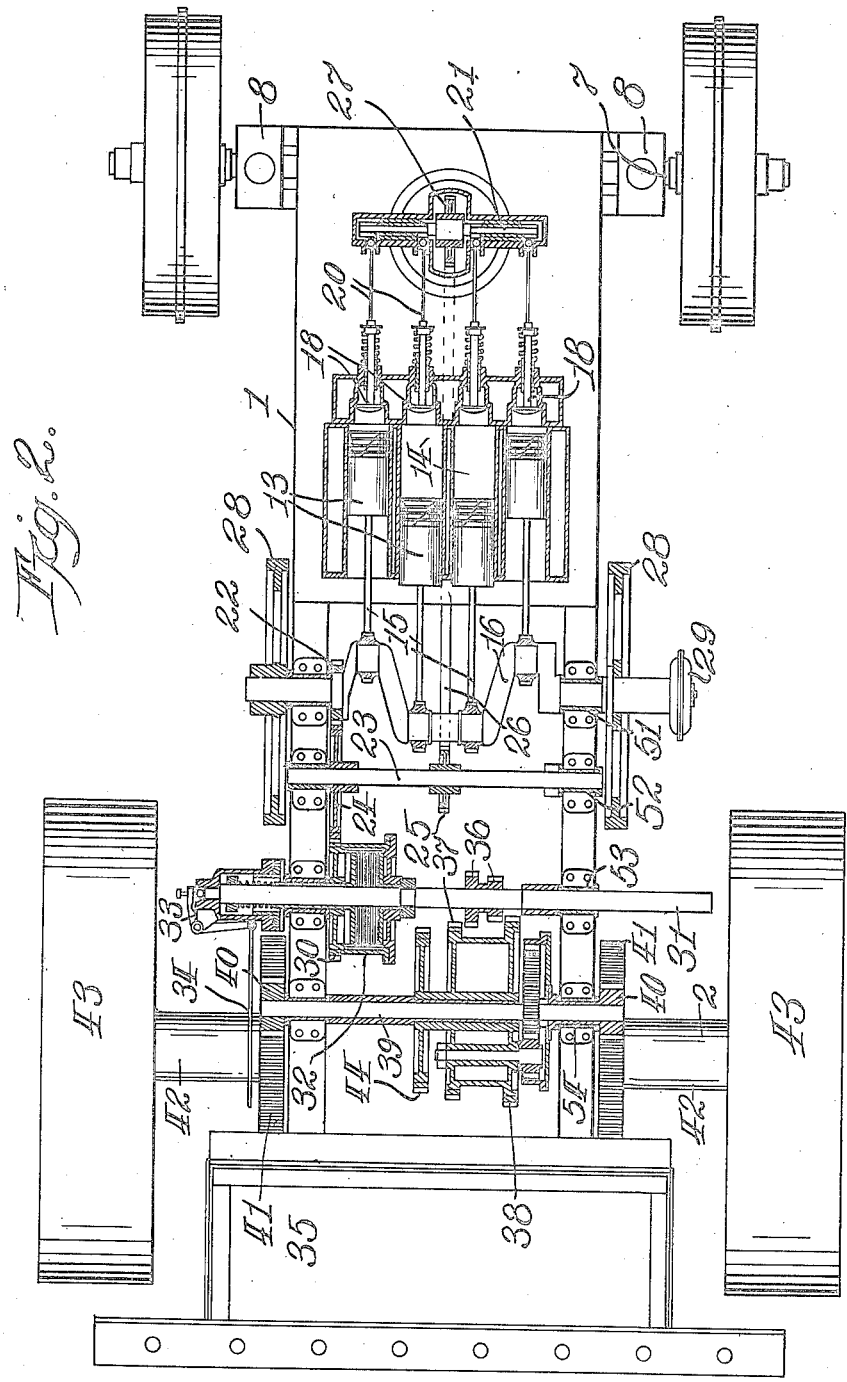

UNITED STATES PATENT OFFICE.

CHARLES A. STICKNEY, OF CHICAGO, ILLINOIS.

TRACTOR.

1,222,812.  Specification of Letters Patent.  Patented Apr. 17, 1917.

Application filed September 17, 1915. Serial No. 51,282.

*To all whom it may concern:*

Be it known that I, CHARLES A. STICKNEY, a citizen of the United States, residing at Chicago, county of Cook, State of Illinois, have invented new and useful Improvements in Tractors, of which the following is a specification.

One object of my invention is to provide a simple and inexpensive tractor that can be manufactured so the total weight of the tractor will be moderate and the power of the engine sufficient to give a high percentage of the total power of the engine at the draw bar.

Another object of my invention is to provide a simple and inexpensive means of applying the power delivered by the engine to the drive wheels.

Another object of my invention is to provide a pulley or other suitable means for running machinery other than the tractor itself and provide a friction clutch integral with the machine that may be used either in transmitting the power of the engine to the drive wheels or the power pulley.

Another object of my invention is to have the various shafts and bearings fashioned so that any part of the machinery may be readily removed for inspection or repair.

Another object of my invention is to provide a differential gearing for the drive wheels that will give a greater torque to one of the drive wheels than to the other, so that in pulling a small number of plows in the ordinary manner at one side of the center line on the machine the center draft of the plows and the tractor may be kept practically in line.

The drawings which form a part of this specification disclose in Figure 1 an elevation of the tractor complete and in Fig. 2 a plan, partly in section, of the entire tractor.

The frame of the engine consists of I-beams 1, joined at the end by suitable angles and plates; the rear axle 2 being riveted or bolted to the I-beams, and T's 3 being provided toward the front of the frame for carrying, through the pins 4 and angle plates 5, the box frame 6, which is riveted or bolted to the front axle 7 to provide a substantial 3 point suspension for the entire load carried by the wheels.

Knuckle joints 8 are provided at the extremities of the front axle and suitable arms pivotally connected with the steering rod 9 and controlled through suitable shafts and gears by the steering wheel 11 provide means for steering the tractor.

The engine 12, Fig. 1, consists of four horizontal cylinders 13 with pistons 14, connecting rods 15, crank 16, Fig. 2, inlet valves 17, Fig. 1, exhaust valves 18 in the head of the cylinders operated through the push rods 19 and 20, respectively, by cams integral with or rigidly attached to the cam shaft 21.

The pinion 22, Fig. 2, keyed to the shaft 16 drives the shaft 23 through the gear 24 keyed thereto at one-half the speed of the crank shaft 16.

The spiral gear 25 keyed to the shaft 23, cam driving shaft 26 and spiral gear 27 serve to drive the cam shaft 21, and the gears 25 and 27 being of the same diameter, the cam shaft 21 is driven at the same speed as the shaft 23, or at one-half the speed of the crank shaft 16, thus operating the valve 17 and 18 in the same general manner as ordinarily employed in four cycle gasolene engines.

The crank shaft 16 has keyed thereon at either end fly wheels 28, and at one end thereof an automatic oiler 29 adapted to furnish hard oil to the connecting rod bearings of the four cranks.

The pinion 22 and gear 24, which meshes with the gear 30, Fig. 2, drives the shaft 31 through the friction clutch pulley 32 at one-half engine speed. The friction clutch 32, which is preferably of the multiple disk type is engaged or disengaged through the actuation of the lever 33, which is brought back by the rod 34 to the cab 35, where it is easily accessible to the operator.

Splined upon the shaft 31 the two diameter pinions 36, coacting with the gears 37, 38 drive the shaft 39 at two different speeds and through the pinions 40 and bull gears 41, which are bolted or otherwise rigidly attached to the hub 42 of the driving wheel 43, drive the tractor forward, the wheels 43 turning on the spindle (not shown) of the rear axle.

The gear 44, which meshes with an idle gear on an independent shaft (not shown) which in turn may be engaged with the larger diameter of the pinion 36, serves in a similar manner to drive the tractor in a reverse direction.

The engine 12, which is preferably of the hopper cooled type, mounts directly on the frame 1 of the tractor and the bearings 51, 52, 53 and 54, which journal respectively the shafts 16, 23, 31 and 39 are mounted in the same horizontal plane as the center line of the engine cylinders, making the babbitting of these bearings in the jig a simple, inexpensive and positive shop operation for manufacture, and furthermore allows complete accessibility for repair of any shafts, gears, clutch or bearings.

While I have described my invention, as embodied in one particular design, and illustrated it in one construction of a tractor, I do not wish it understood that I limit myself to this construction, as it is evident my invention may be varied within the scope of the following claims.

I claim:

1. In a tractor the combination of an internal combustion engine having a crank shaft, a pair of driving wheels, having bull gears mounted thereon, a pair of bull pinions intermeshing with said bull gears, a friction clutch pulley, one side of which is keyed to a power shaft, a set of gears intermeshing said crank shaft with the other side of said friction clutch pulley, means for engaging said friction clutch pulley so that said crank shaft and said power shaft will be interconnected, a pinion on said power shaft, a transmission shaft, having a differential gearing thereon and transmission gears thereon, a slidable gear on said power shaft adapted to be engaged with transmission gears on said transmission shaft and a bull pinion mounted on said transmission shaft intermeshing with said bull gears.

2. In a tractor the combination of an internal combustion engine having a crank shaft, a pair of driving wheels having bull gears mounted thereon, a transmission shaft, a pair of bull pinions mounted on said transmission shaft and intermeshing with said bull gears, a differential gear operating said transmission shaft and said bull pinions adapted to transmit a greater torque to one of said bull pinions than to other of said bull pinions, a power shaft having a friction clutch pulley coöperating therewith and slidable gears thereon, gears associated with said transmission shaft adapted to be meshed with said slidable gears, a set of spur gears adapted to interconnect one side of said friction clutch pulley with said crank shaft and means for engaging said friction clutch pulley so as to interconnect said power shaft with said crank shaft.

CHARLES A. STICKNEY.